3,304,295
LITHIUM, LITHIUM ALUMINUM HYDRIDE, TITANIUM TRICHLORIDE AND PROMOTER FOR OLEFIN POLYMERIZATION
Hugh J. Hagemeyer, Jr., and Marvin B. Edwards, Longview, Tex., assignors to Eastman Kodak Company, Rochester, N.Y., a corporation of New Jersey
No Drawing. Filed July 13, 1964, Ser. No. 382,351
18 Claims. (Cl. 260—93.7)

This application is a continuation-in-part of copending U.S. application Serial No. 28,826, filed May 13, 1960.

This invention relates to the polymerization of hydrocarbons and catalysts useful for this purpose. More particularly, this invention relates to the catalytic polymerization of α-monoolefinic hydrocarbons containing at least 3 carbon atoms to form solid, highly crystalline polymers using a catalyst mixture that is highly stereospecific at high temperatures.

It is well known that in the catalytic polymerization of α-olefinic hydrocarbons such as propylene or butene, it is possible to produce polymers having widely different properties and physical characteristics depending, to a large extent, upon the catalyst system and the process conditions. Much of the work in this field has been directed to the development of catalysts and catalytic processes that are capable of forming highly crystalline polymers, i.e., those having crystallinities of at least 70%, since it has been shown that these highly crystalline polymers have greatly improved properties over the completely or predominately amorphous polymers. For example, amorphous polypropylene that has been formed as a solid by some of the methods known in the art has a melting point of only 80° C. and a density of 0.85 while solid, highly crystalline polypropylene has a melting point of at least 165° C. and a density of 0.92. Similarly, crystalline polybutene-1 has a melting point of 120° C. and a density of 0.91 whereas the amorphous polybutene-1 has a softening point of about 60° C. and a density of 0.87. This same increase in density and melting point is observed with other α-olefins in solid polymeric form including both the straight and branched chain α-monoolefins. Thus, crystalline poly(3-methylbutene-1) has a melting point in excess of 240° C., crystalline poly(4-methylpentene-1) has a melting point in excess of 205° C., crystalline poly (4-methylhexene-1) has a melting point of about 190° C., crystalline poly(5-methylhexene-1) has a melting point of the order of 130° C. and crystalline poly(4,4-dimethylpentene-1) has a melting point in excess of 300° C. It is apparent, therefore, that polymerization processes and catalysts that will form highly crystalline polymers from α-olefinic hydrocarbons, i.e., those polymers having crystallinities of at least 70%, are of considerable importance in the art.

A number of methods have been proposed for preparing such solid, highly crystalline polymers including, for example, the polymerization of ethylene and higher α-olefins such as propylene and butene-1 to highly crystalline polymers in the presence of inert diluents at temperatures of 100° C. or below and at relatively low pressures. Catalysts mixtures that have been employed in these so called slurry processes comprise an aluminum compound, e.g. an aluminum alkyl, a dialkyl aluminum halide, an alkyl aluminum sesquihalide or lithium aluminum tetraalkyl and a cocatalyst, e.g. a transition element halide. However, when catalysts of this type are used at temperatures above 100° C., the transition element halide is rapidly reduced and an inactive catalyst results. These prior art catalysts, therefore, cannot be used for polymerization at elevated temperatures which would permit formation of the polymer near or above its melting point, without fouling of the catalyst or inactivation of the system. Furthermore, elevated temperatures would also obviate the difficulties inherent in many of the lower temperature processes wherein the formation of the polymer causes a deposit on the catalyst sufficient to cause inactivation or, where the polymerization is carried out in a solvent medium, the polymerization mixture becomes too viscous for adequate agitation before the catalyst is exhausted with a resultant loss in the economy of the process and a necessity for removing large amounts of residual catalyst from the resulting polymer.

Another advantage of higher temperatures over lower temperatures in the polymerization of α-olefinic hydrocarbons is that the induction time for a catalyst decreases as the temperature rises. Thus, Natta et al. give data in La Chimica e l'Industria 39, paragraph 12 (No. 12) 1002–1012 (1957), specifically in FIGURE 5, which demonstrates that an increase in the temperature from 32° C. to 70° C. shortens the time required to approach a constant rate of polymerization from 7 hours to 2 hours. At temperatures of at least 140° C. and preferably 150° C. this induction period is substantially eliminated, provided, of course, that the catalyst is not inactivated at these high temperatures. It is also significant that, Natta, in the same series of articles, points out that catalyst such as aluminum alkyls and titanium trichloride give lower crystallinities at higher temperatures.

Still another significant advantage of high temperature solution polymerization processes over the low temperature slurry processes is that, in the former, the catalyst concentrations are generally so low that it is possible to simply filter the polymer solution to obtain products with residual ash contents low enough to be satisfactory for most commercial uses. In contrast, it is exceedingly difficult to separate a solid by chemical reaction and extraction which must be used in the low temperature slurry processes. Furthermore, separation of a catalyst by filtration and polymer recovery by melt concentration in these high temperature processes avoids contamination of recycle olefin and solvent streams with polar solvents such as alcohols which are employed in the low temperature slurry processes to wash out the catalyst from the polymer. Polar solvents such as alcohols are, of course, catalyst poisons, and, therefore, the recycle olefin and solvent streams in a low temperature slurry process must be vigorously purified to remove these polar contaminants. In a high temperature solution process, however, the monomer and solvent streams can be merely filtered, concentrated and recycled directly to the synthesis step without extensive purification treatments which are so necessary in the low temperature slurry processes.

It is also known that many crystalline polymers of α-olefinic hydrocarbons are not suitable for many low temperature applications due to their poor brittle points. Brittle point is the temperature at which a polymer exhibits brittle failure under specific impact conditions as measured, for example, by ASTM D746-55T. Thus, crystalline polypropylene prepared by conventional prior art procedures generally exhibits a brittle point of about 20° C. which severely restricts its utility in low temperature applications such as packaging of frozen foods.

It is evident, from the discussion hereinabove, that the state of the art will be greatly enhanced by a catalytic polymerization process for the preparation of solid, highly crystalline polymers at elevated temperatures. Likewise, a noteworthy contribution to the art will be a catalyst that is effective at elevated temperatures to form solid, high molecular weight α-olefinic hydrocarbon polymers having improved properties, particularly low temperature properties.

It is accordingly an object of this invention to provide a novel process for the polymerization of α-olefinic hydrocarbons to high molecular weight polymers and particularly to solid, high molecular weight polymers having very high crystallinities, i.e., crystallinities of at least 70%.

Another object of this invention is to provide a novel process for the polymerization of α-olefinic hydrocarbons to high molecular weight, highly crystalline polymers at elevated temperatures.

Another object of this invention is to provide a novel polymerization process that employs a catalytic mixture which, unlike closely related mixtures, is highly effective for polymerizing α-olefinic hydrocarbons to solid polymer having improved physical properties and which possess an unusual degree of stereospecificity whereby objectionable formation of low molecular weight polymers that are oily or greasy in nature is avoided and whereby the formation of amorphous solid polymer is also largely obviated.

Another object of this invention is to provide a novel polymerization process that employs a catalyst composed of at least three components that gives results which can be reproduced, has a long life and gives high polymer to catalyst yields.

Another object of the invention is to facilitate the commerical production of very highly crystalline solid polymer whereby hydrocarbon polymers of very high softening points, high tensile characteristics, good moldability, improved stiffness and film forming properties are readily obtained.

Other objects will be apparent from the description and claims which follow.

In accordance with this invention, it has been found that α-olefinic hydrocarbons containing at least 3 carbon atoms can be polymerized at elevated temperatures to solid, high molecular weight polymer having improved properties and crystallinities of at least 70% in the presence of a catalyst comprising (1) lithium metal, (2) lithium aluminum hydride and (3) a halide of a transition metal from Group IV-B—VI-B of the Periodic Table, in which the valence of the metal is at least one less than maximum.

This novel process is extremely effective for polymerizing α-olefinic hydrocarbons containing at least 3 carbon atoms and particularly the straight and branched chain aliphatic or aromatic α-monoolefinic hydrocarbons containing 3 to 10 carbon atoms to form solid, high molecular weight, highly crystalline polymer in excellent yield. The polymerizable α-olefinic hydrocarbons suitable for use in the practice of this invention include, for example, propylene, butene-1, pentene-1, octene-1, decene-1, 3-methyl-1-butene, 4-methyl-1-pentene, 4-methyl-1-hexene, 5-methyl-1-hexene, 4,4-dimethyl-1-pentene, styrene, α-methylstyrene, allylcyclohexane, allylcyclopentane, allylbenzene and similar α-olefinic hydrocarbons containing at least 3 carbon atoms. In practicing the invention, such α-olefinic hydrocarbons can be polymerized alone, in admixture or sequentially with each other or with other polymerizable hydrocarbons such as ethylene.

It is possible to employ either lithium metal or lithium aluminum hydride with transition element halides as catalysts for the high temperature polymerization of α-olefinic hydrocarbons at elevated temperatures. However, lithium is a high melting alkali metal (melting point 186° C.) and at the elevated temperatures generally employed for the polymerization of α-olefinic hydrocarbons it is extremely difficult to duplicate lithium dispersions. Since the availability of lithium in forming the active catalyst with the transition element halide is a function of the particle size and dispersion of lithium, there is considerable variation from one batch of catalyst to another with resultant difficulty in controlling the polymerization reaction. Furthermore, lithium aluminum hydride is an extremely reactive agent and is susceptible to destruction not only by temperature but also by impurities such as carbon monoxide, carbon dioxide, water and other substances which are normally present in the monomer and solvent streams. In contrast, catalyst mixtures of lithium, lithium aluminum hydride and the aforementioned transition element halides can be duplicated from batch to batch to obtain reproduceable results for a given set of conditions of temperature and pressure.

Another advantage which is realized by employing mixtures of lithum and lithium aluminum hydride rather than either component alone is that much higher crystallinities and molecular weights are obtained in the polymerization process. Furthermore, the catalyst systems of this invention are extremely rugged and exhibit a long life which is particularly important in continuous processing. Still another significant feature of the catalyst of this invention is that catalyst residue can be separated by any suitable mechanical means such as centrifugation or filtration and recycled to the polymerization reaction.

It is important to note that both lithium and lithium aluminum hydride components of the catalyst act as co-catalysts in combination with the transition element halides. This is shown by a definite effect upon inherent viscosity when the mole ratio of either one is changed while holding the other constant, as illustrated by the following examples, particularly Example 3.

As already indicated, one component of the catalyst is lithium metal and another component of the catalyst mixture is lithium aluminum hydride. These catalyst components are combined with at least one subvalent halide of a transition metal from Group IV-B—VI-B of the Periodic Table to form the active catalyst. The Periodic Table referred to herein can be found in "Lange's Handbook of Chemistry," 8th Edition (1952), published by Handbook Publishers, Inc., at pages 56 and 57.

The transition metals included in Groups IV-B, V-B and VI-B of the Periodic Table are exemplified by titanium, zirconium, vanadium, molybdenum, chromium and the like. The preferred transition metals are those having molecular weights in the range of about 47 to about 52, i.e., titanium, vanadium or chromium. The metals in these metal polyhalides exhibit a valence which is at least one less than maximum. It is preferred that the titanium halides such as titanium trichloride, or tribromide be employed in the practice of this invention. These halides can be prepared by any suitable method. Thus, titanium trichloride, for example, can be prepared by reducing titanium tetrachloride with hydrogen, alkali metals or other metals such as aluminum, titanium, antimony and the like. Transition metal halides other than titanium halides which give good results include, for example, vanadium trichloride, vanadium dichloride, molybdenum dichloride, tungsten dibromide, zirconium trichloride, chromium dichloride and the like. The catalyst components are generally employed in mole ratios of the lithium and lithium aluminum hydride components, based on lithium content, to transition metal halide in the range of about 1:2 to about 10:1; with preferred mole ratios being in the range of about 1:1 to about 4:1.

The components referred to hereinabove make up the effective catalyst for the process. However, the stereospecificity of the catalyst can be improved by employing another component which, by itself, is not an effective catalyst for the reaction. These additional components often lead to the preparation of polymers of higher molecular weight for a given polymerization temperature and it is advantageous to employ them in practicing this invention. Such additional components are exemplified by alkali metal halides such as sodium or potassium fluoride, and oxides or lower alkoxides of calcium, magnesium or aluminum such as magnesium oxide, calcium oxide, aluminum ethoxide, aluminum isopropoxide or the like. The lower alkyl groups in the alkoxides generally contain up to about 4 carbon atoms and include methyl, ethyl, butyl and the like. The fluorides are the preferred alkali metal halides but the chlorides or iodides are suitable. These additional catalyst components are usually employed in mole ratios in the range of about 0.1:10, and preferably 0.25:5, based on the transition metal subhalide.

The polymerization in accordance with this invention is generally carried out at pressures in the range of about atmospheric to about 2,000 atmospheres. Usually pressures greater than 15 atmospheres, and preferably in the range of about 15 to 300 atmospheres, are employed to obtain commercially satisfactory rates. Higher pressures are generally required for the polymerization in the absence of a solvent. In the absence of a solvent, the gas dissolved in the polymer should generally be from 1 to 4 times the weight of the polymer in order to obtain viscosities that can be handled satisfactorily in the reactor space. Increasing the quantities of dissolved gas lowers the viscosity in the reactor space which allows for better heat transfer and good catalyst distribution. The pressure in the polymerization can be achieved in any desirable manner, a convenient method being to pressure the system which the monomer or monomers being polymerized.

The polymerization reaction can be carried out in the presence or absence of an inert organic liquid vehicle. When the polymerization is carried out in the presence of an inert organic liquid vehicle, this vehicle can be any of the inert organic liquids which contain no combined oxygen and which are free of water, alcohol, ether or other compounds containing oxygen or compounds containing unsaturation. The organic vehicle employed can be an aliphatic alkane or cycloalkane such as pentane, hexane, heptane or cyclohexane, or a high molecular weight liquid paraffin or mixture of paraffins which are liquid at the reaction temperature, or an aromatic hydrocarbon such as benzene, toluene, xylene or the like, or a halogenated aromatic compound such as chlorobenzene. A petroleum fraction of suitable boiling range such as odorless mineral spirits (a sulfuric acid washed paraffinic hydrocarbon boiling at about 180°–200° C.) will give particularly good results. In addition, good results can be obtained when the polymerization is carried out in the presence of a dense gas such as highly compressed propylene by operating at elevated pressures.

The catalyst mixtures of this invention are extremely effective at elevated temperatures. Thus, the polymerization reaction can be carried out at temperatures in the range of about 140° C. to about 300° C. and preferably at temperatures in the range of about 150° C. to about 250° C. At these high temperatures the catalyst is employed in concentrations of about 0.01 to about 5%, by weight, based on the monomer being polymerized, with preferred catalyst concentrations being in the range of about 0.1 to about 1%, by weight. Lower catalyst concentrations can be employed, but generally the rate of polymer formation is quite slow and at higher catalyst concentrations considerable difficulty is encountered in controlling the reaction. The concentration of the catalyst employed will generally depend upon the desired method of operation, for example, low catalyst concentrations would be used where high polymer to catalyst yields are desired. On the other hand, high catalyst concentrations are employed where high polymer yields per unit of reactor space are desired.

The process of this invention makes it possible to prepare a highly crystalline polymer, i.e. one exhibiting a crystallinity in excess of 70, 80 or even 90%. The crystallinity of the product can be determined by extraction or X-ray diffraction techniques that are well known in the art. For example, the crystallinity of polypropylene is determined by refluxing the polymer in hexane, the portion of the solid polymer insoluble in refluxing hexane being the crystalline portion.

This invention can be further illustrated by the following examples of preferred embodiments thereof although it will be understood that these examples are included merely for purposes of illustration and are not intended to limit the scope of the invention unless otherwise specifically indicated:

*Example 1*

As already indicated, a catalyst comprising lithium metal, lithium aluminum hydride and a Group IV–B—VI–B transition metal subhalide is an effective catalyst for the polymerization of an α-monoolefinic hydrocarbon, either alone, in admixture and in sequence with other polymerizable monomers at elevated temperatures.

To illustrate, propylene is compressed to 1250 to 1500 atmospheres and fed, at rates varying from 8,600 to 14,100 pounds per hour, into an elongated reactor 14 feet long with 20 inches internal diameter, which reactor is separated into two distinct reaction zones by a centrally located baffle. The reactor also has a stirring mechanism extending through the two reaction zones. In the top zone the agitator shaft that extends through the center of the reactor is provided with a single 4-bladed paddle type agitator at the top of the zone. In the second zone mixing paddles are placed substantially along the entire length of the agitator shaft to give a plug flow with a minimum of back mixing from the second to the first zone.

A catalyst consisting of 3.26 parts, by weight, of lithium metal dispersion, 0.17 part, by weight, lithium aluminum hydride and 14.3 parts, by weight, titanium trichloride slurried in cyclohexane, is fed at rates varying from 0.2 to 0.45 pound per hour. The temperature in the first zone is controlled by external cooling and by controlling the rate of feed and temperature of the incoming propylene. Conversions in the first zone are generally controlled at 20–40% by controlling the propylene feed rate and the catalyst concentration employed.

In the second zone, ethylene is fed to give a feed rate varying from 100 to 1,000 pounds per hour to obtain a polymer having a crystallinity, shown by extraction in boiling hexane, in excess of 70%. The results of four runs using the above procedures are set forth in the following table.

TABLE I

| Run No. | 1 | 2 | 3 | 4 |
| --- | --- | --- | --- | --- |
| Propylene feed to first zone, lbs./hr. | 10,800 | 12,100 | 8,900 | 7,300 |
| 3.2 Li, 0.17 LiAlH$_4$, 14.3 TiCl$_3$ Catalyst feed, lbs./hr. | 0.23 | 0.46 | 0.31 | 0.41 |
| Reactor pressure, atms. | 1,270 | 1,300 | 1,250 | 1,500 |
| Reactor temperatures, ° C.: | | | | |
| First zone top | 170 | 168 | 174 | 178 |
| First zone bottom | 190 | 193 | 191 | 193 |
| Second zone top | 190 | 192 | 196 | 199 |
| Second zone bottom | 186 | 190 | 199 | 206 |
| Ethylene feed to second zone, lbs./hr. | 230 | 380 | 360 | 310 |
| Production rate, lbs./hr. | 3,360 | 4,020 | 2,170 | 2,420 |
| Inherent viscosity (tetralin, 145° C.) | 2.57 | 2.31 | 2.42 | 2.68 |
| Percent ethylene in polymer | 2.1 | 3.9 | 7.0 | 9.0 |
| Brittleness temperature, ° C. | −25 | −41 | <−60 | <−60 |

*Example 2*

The catalyst employed in the process of this invention can contain additional components such as alkali metal halides or oxides or alkoxides of calcium, magnesium or aluminum. To illustrate, a mixture comprising 9 g. of lithium metal, 12.4 g. of lithium aluminum hydride, 100 g. of titanium trichloride and 27 g. of sodium fluoride is charged to an 80-gallon autoclave containing 42.5 gallons of mineral spirits. A feed of 50 volume percent propylene, 47 volume percent butene-1, and 3 volume percent propane is pumped in until the pressure is 400 p.s.i. The polymerization is run at 150° C. for 12 hours. The polymerizate is filtered and concentrated to yield 56 pounds of propylene-1-butene copolymer having an inherent viscosity in tetralin at 145° C. of 1.55 (0.25% concentration). The percent of 1-butene in the polymer is 42%.

*Example 3*

As pointed out hereinabove, the lithium and lithium aluminum hydride act as co-catalysts in combination with the transition metal halide, as shown by the definite effect upon inherent viscosity when the concentration of either one is changed while holding the other one constant. To illustrate, a series of 3 runs is made in an 80-gallon stirred autoclave, using propylene as the monomer. The polymerization is run at a temperature of 160° C. and a pressure of 400 p.s.i.g. for 12 hours. 40 gal. of mineral spirits is employed as the solvent. The results are as follows:

TABLE II

| Run No. | Catalyst Components, Mole Ratio | | | | Catalyst Charge, Grams | Lbs. Polymer/Lb. Catalyst | Inherent Viscosity in Tetralin at 145° C. | Percent Crystallinity (Hexane Extraction) |
|---|---|---|---|---|---|---|---|---|
| | Li | LiAlH$_4$ | TiCl$_3$ | NaF | | | | |
| 1 | 2.0 | 0.5 | 1 | 1 | 120 | 404 | 2.02 | 86.2 |
| 2 | 1.0 | 0.5 | 1 | 1 | 116 | 409 | 1.86 | 80.2 |
| 3 | 0.5 | 0.5 | 1 | 1 | 114 | 462 | 1.52 | 76.7 |

TABLE III

| Properties | Runs | | | Crystalline Polypropylene |
|---|---|---|---|---|
| | 1 | 2 | 3 | |
| Reaction Temperature, ° C | 173 | 168 | 160 | |
| Flow Rate at 230° C. and 2,160 g. load | 2.42 | 1.76 | 1.56 | 4.62 |
| Inherent Viscosity in Tetralin at 145° C | 1.50 | 1.88 | 2.09 | 1.56 |
| Density | 0.9101 | 0.9114 | 0.9080 | 0.9097 |
| Brittleness Temperature, ° C | −12 | −6 | −12 | >+20 |
| Tensile Impact Strength | 59 | 60 | 64 | 20 |
| Izod Impact Strength at 23° C. (Notched) | .74 | .82 | 1.01 | 0.43 |
| Izod Impact Strength at 23° C. (Unnotched) | (¹) | (¹) | (¹) | 16 |

¹ No break.

*Example 4*

The polymerization of α-olefinic hydrocarbons such as propylene according to the process of this invention gives a polymer having improved physical properties, particularly brittle point, tensile impact strength, and notched Izod impact strength. To illustrate, a series of crystalline polypropylenes, i.e., polypropylenes which are insoluble in refluxing hexane, are prepared in a continuous system employing two 500-gallon stirred reactors in series. In the first stirred reactor the feed is mineral spirits solvent, propylene and catalyst. The catalyst is a 2:0.5:1:1 mixture of lithium, lithium aluminum hydride, titanium trichloride and magnesium oxide. The polymerization is carried out at 160° C. at 1,000 p.s.i.g. The feed rates are adjusted to give a polymer content of 20–35%. The effluent from the first reactor passes to the second stirred reactor where additional solvent and propylene are added at rates to maintain solids content at 30–38% and propylene at 18–23%.

From the second reactor the polymer solution is let down to a dilution tank at 50 p.s.i.g. where unreacted propylene is flashed off and recycled mineral spirits is added to give a 10% polymer solution. The 10% polymer dope is filtered and then concentrated by stripping with hot propylene at 200° C. The polypropylene is extruded through water and chopped into ⅛-inch pellets. The pellets are extracted with hexane at 69° C. for 12 hours to give an 88% yield of crystalline polypropylene. The properties of this polymer together with two polymers prepared at 168° C. and 173° C. are set forth in the following table. For comparison purposes, the properties of a commercial crystalline polypropylene are also set forth.

It can be seen from the above table that the polymers prepared according to the practice of this invention exhibit improved properties, and particularly, lower brittle points which are significantly lower than those generally associated with commercial crystalline polypropylene. It can readily be seen that the tensile strengths and Izod impact strengths of polymers prepared according to the practice of this invention also show a marked improvement in comparison to commercial crystalline polypropylene.

*Example 5*

Any of the α-monoolefinic hydrocarbons, and particularly those containing 2–10 carbon atoms, can be polymerized according to the practice of this invention. To illustrate, a series of runs are made in a 2-liter stirred autoclave employing 5 g. of 2:0.5:1:1 mole mixture of lithium metal, lithium aluminum hydride, titanium trichloride and sodium fluoride suspended in cyclohexane with some of these hydrocarbons. The polymerization conditions and results are set forth in the following table.

TABLE IV

| Run No. | Monomer | Polymerization Conditions | | Yield, g. | Percent Crystallinity (percent insoluble in boiling pentane) | Inherent Viscosity in Tetralin at 145° C. |
|---|---|---|---|---|---|---|
| | | Temp., ° C. | Pressure | | | |
| 1 | Butene-1 | 170 | 1,250 | 263 | 84 | 2.04 |
| 2 | Butene-1 | 163 | 1,200 | 143 | 76 | 2.41 |
| 3 | 4 Methyl Pentene-1 | 170 | 1,200 | 169 | 86 | 2.25 |
| 4 | Butene-1 | 160 | 1,200 | 298 | 88 | 2.65 |

Similar results are obtained when other α-olefinic unsaturated hydrocarbons, especially the α-monoolefinic hydrocarbons, are substituted for the monomers employed in the above procedure. Thus, the substitution of propylene, pentene, decene, allylcyclohexane or allylcyclopentane, for the above monomers, gives polymers having good physical properties and crystallinities in excess of 70%.

*Example 6*

The titanium chlorides are the preferred transition metal halides used in the catalysts employed in the practice of the process of this invention. However, any of the transition metal halides from Groups IV-B—VI-B of the Periodic Table in which the metal has a valence at least one less than maximum are suitable. To illustrate, a series of runs are made in a 2-liter stirred autoclave using a catalyst charge of 4 g. in each run. The monomer employed is propylene and the results are as follows.

TABLE V

| Catalyst Components | Mole Ratio of Components | Polymerization Conditions | | | Yield, g. | Percent Crystallinity (percent insoluble in boiling hexane) | Inherent Viscosity in Tetralin at 145° C. |
| --- | --- | --- | --- | --- | --- | --- | --- |
| | | Temp., °C. | Pressure | Solvent | | | |
| Li<br>LiAlH$_4$<br>VCl$_3$<br>MgO | 2:0.5:1:1 | 165 | 1,000 | Mineral spirits | 210 | 91 | 2.49 |
| Li<br>LiAlH$_4$<br>VCl$_3$<br>Al(OPr)$_3$ | 2:0.5:1:0.5 | 170 | 1,180 | do | 185 | 88 | 2.61 |
| Li<br>LiAlH$_4$<br>CrCl$_2$<br>NaF | 2:0.5:1:0.5 | 168 | 1,000 | Cyclohexane | 96 | 93 | 2.10 |

Similar results are obtained with subhalides of any of the transition metals of Group IV–B—VI–B of the Periodic Table. The most suitable metals are those having atomic weights in the range of about 47 to about 52, i.e., titanium, vanadium and chromium, although molybdenum or tungsten also give good results.

*Example 7*

Polymers prepared using mixtures of lithium and lithium aluminum hydride with transition metal halides give polymers exhibiting markedly improved physical properties in comparison to polymers prepared using either lithium or lithium aluminum hydride singly with a transition metal halide. To illustrate, four systems, i.e., (1) lithium metal, titanium trichloride and sodium fluoride, (2) lithium aluminum hydride, titanium trichloride and sodium fluoride, (3) lithium metal, lithium aluminum hydride, titanium trichloride and sodium fluoride and (4) lithium metal, lithium aluminum hydride and titanium trichloride are employed to polymerize propylene. The same solvent and type of titanium trichloride are employed in all of these runs and the lithium dispersions and lithium aluminum hydrides are from the same source. The temperature is controlled at 160°±2° C., and the pressure at 400±20 p.s.i.g. 40 g. of titanium trichloride is used as the standard charge and the other components are added in an amount found to give optimum mole ratios. The results of these runs are set forth in the following table.

It can be seen from the above table that the catalyst employed in the practice of this invention results in a polymer having significantly improved properties. In addition, it can be seen that the catalyst has a significantly longer life.

Thus, by the practice of this invention there is provided to the art a specific catalyst mixture which can be employed at elevated temperatures to form solid, high molecular weight, highly crystalline polymers from α-olefinic hydrocarbons containing at least 3 carbon atoms. The components of the catalyst mixture are readily available materials and are easily handled in commercial operations which makes them readily adapted to commercial scale production. The polymers that are obtained in accordance with the practice of this invention can be used for forming film, molded articles, coated articles and the like, which products exhibit improved low temperature properties. They can be blended with other plastic materials or compounded with pigments, dyes, fillers, stabilizers and the like. The process of this invention is applicable to forming copolymers, both random and block, from α-olefins containing at least 3 carbon atoms and a variety of products can be readily obtained by varying the relative proportions of the components in the mixtures of monomers being polymerized.

Although the invention has been described in considerable detail with reference to certain preferred embodiments thereof, it will be understood that variations and modifications can be effected without departing from the spirit and scope of the invention as described hereinabove and as defined in the appended claims.

TABLE VI

| Catalyst Components | Mole Ratio of Components | Init. Cat. Act.[1] | Effective Catalyst Life, Hrs. | Percent Crystallinity (percent insoluble in boiling hexane) | Inherent Viscosity in Tetralin at 145° C. | Properties of Crystalline Polypropylene | |
| --- | --- | --- | --- | --- | --- | --- | --- |
| | | | | | | Brit. Temp., °C. | Tensile Impact Strength |
| Li<br>TiCl$_3$<br>NaF | 5:1:1 | 46 | 8 | 76 | 1.37 | >+20 | 26 |
| Li<br>TiCl$_3$<br>NaF | 5:1:1 | 53 | 9.5 | 72 | 1.52 | >+20 | 19 |
| LiAlH$_4$<br>TiCl$_3$<br>NaF | 1:1:1 | 60 | 7 | 91 | 1.88 | >+20 | 34 |
| LiAlH$_4$<br>TiCl$_3$<br>NaF | 1:1:1 | 62 | 6.8 | 88 | 1.81 | >+20 | 31 |
| Li<br>LiAlH$_4$<br>TiCl$_3$<br>NaF | 2:0.5:1:1 | 67 | >12 | 86 | 2.49 | −16 | 83 |
| Li<br>LiAlH$_4$<br>TiCl$_3$<br>NaF | 2:0.5:1:1 | 59 | >12 | 88 | 2.34 | −12 | 80 |
| Li<br>LiAlH$_4$<br>TiCl$_3$ | 2:0.5:1 | 78 | >12 | 84 | 2.02 | −12 | 67 |

[1] Initial Catalyst Activity, Grams Polymer/Gram Catalyst/Hour.

We claim:
1. The process for polymerizing an α-monoolefinic hydrocarbon containing at least 3 carbon atoms to solid, high molecular weight polymer having a crystallinity of at least 70% which comprises contacting said α-monoolefinic hydrocarbon, at a temperature in the range of about 140° to about 300° C. and a pressure in the range of atmospheric to about 2000 atmospheres with a catalyst comprising (1) lithium metal, (2) lithium aluminum hydride and (3) a halide of a transition metal from Group IV-B—VI-B of the Periodic Table, the valence of the metal in said halide being at least one less than maximum, the mole ratio of (1) and (2), based on lithium content, to (3) being in the range of about 1:2 to about 10:1.

2. The process for polymerizing an α-monoolefinic hydrocarbon containing at least 3 carbon atoms to solid, high molecular weight polymer having a crystallinity of at least 70% which comprises contacting said α-monoolefinic hydrocarbon, at a temperature in the range of about 140° to about 300° C. and a pressure in the range of atmospheric to about 2000 atmospheres with a catalyst comprising (1) lithium metal, (2) lithium aluminum hydride, (3) a halide of a transition metal from Group IV-B—VI-B of the Periodic Table, the valence of the metal in said halide being at least one less than maximum and (4) a member selected from the group consisting of a halide of an alkali metal, an oxide of a metal selected from the group consisting of calcium, magnesium, and aluminum and a lower alkoxide of a metal selected from the group consisting of calcium, magnesium and aluminum, the mole ratio of (1) and (2), based on lithium content, to (3) being in the range of about 1:2 to about 10:1 and the mole ratio of (4) to (3) being in the range of about 0.1:10 to about 0.25:5.

3. The process for polymerizing an α-monoolefinic hydrocarbon containing 3-10 carbon atoms to solid, high molecular weight polymer having a crystallinity of at least 70%, which comprises contacting said α-monoolefinic hydrocarbon, at a temperature in the range of about 140° to about 300° C. and a pressure in the range of about atmospheric to about 2000 atmospheres, with a catalyst comprising (1) lithium metal, (2) lithium aluminum hydride and (3) a halide of a transition metal from Group IV-B—VI-B of the Periodic Table, said metal having an atomic weight of about 47 to about 52, the valence of the metal in said halide being at least one less than maximum, the mole ratio of (1) and (2), based on lithium content, to (3) being in the range of about 1:1 to about 4:1.

4. The process for polymerizing an α-monoolefinic hydrocarbon containing 3-10 carbon atoms to solid, high molecular weight polymer having a crystallinity of at least 70% which comprises contacting said α-monoolefinic hydrocarbon, at a temperature in the range of about 140° to about 300° C. and a pressure in the range of atmospheric to about 2000 atmospheres, with a catalyst comprising (1) lithium metal, (2) lithium aluminum hydride, (3) a halide of a transition metal, said metal having an atomic weight in the range of about 47 to about 52, the valence of the metal in said halide being at least one less than maximum and (4) a member selected from the group consisting of a halide of an alkali metal, an oxide of a metal selected from the group consisting of calcium, magnesium and aluminum and a lower alkoxide of a metal selected from the group consisting of calcium, magnesium and aluminum, the mole ratio of (1) and (2), based on lithium content, to (3) being in the range of about 1:1 to about 4:1 and the mole ratio of (4) to (3) being in the range of about 0.1:10 to about 0.25:5.

5. The process for polymerizing an α-monoolefinic hydrocarbon containing at least 3 carbon atoms to solid, high molecular weight polymer having a crystallinity of at least 70%, which comprises contacting said α-monoolefinic hydrocarbon, at a temperature in the range of about 150° to about 250° C. and a pressure in the range of about 15 to about 300 atmospheres with a catalyst comprising (1) lithium metal, (2) lithium aluminum hydride and (3) a halide of a transition metal from Group IV-B—VI-B of the Periodic Table, the valence of the metal in said halide being at least one less than maximum, the mole ratio of (1) and (2), based on lithium content, to (3) being in the range of about 1:2 to about 10:1.

6. The process for polymerizing an α-monoolefinic hydrocarbon containing at least 3 carbon atoms to solid, high molecular weight polymer having a crystallinity of at least 70% which comprises contacting said α-monoolefinic hydrocarbon, at a temperature in the range of about 140° to about 300° C. and a pressure in the range of atmospheric to about 2000 atmospheres with a catalyst comprising (1) lithium metal, (2) lithium aluminum hydride, (3) a halide of a transition metal from Group IV-B—VI-B of the Periodic Table, the valence of the metal in said halide being at least one less than maximum and (4) a member selected from the group consisting of a halide of an alkali metal, an oxide of a metal selected from the group consisting of calcium, magnesium and aluminum and a lower alkoxide of a metal selected from the group consisting of calcium, magnesium and aluminum, the mole ratio of (1) and (2), based on lithium content, to (3) being in the range of about 1:2 to about 10:1 and the mole ratio of (4) to (3) being in the range of about 0.1:10 to about 0.25:5.

7. The process for polymerizing propylene to solid, high molecular weight polymer having a crystallinity of 70%, which comprises contacting said α-monoolefinic hydrocarbon, at a temperature in the range of about 140° to about 300° C. and a pressure in the range of atmospheric to about 2000 atmospheres with a catalyst comprising (1) lithium metal, (2) lithium aluminum hydride, (3) a halide of a transition metal from Group IV-B—VI-B of the Periodic Table, the valence of the metal in said halide being at least one less than maximum and (4) a member selected from the group consisting of a halide of an alkali metal, an oxide of a metal selected from the group consisting of calcium, magnesium and aluminum and a lower alkoxide of a metal selected from the group consisting of calcium, magnesium and aluminum, the mole ratio of (1) and (2), based on lithium content, to (3) being in the range of about 1:2 to about 10:1 and the mole ratio of (4) to (3) being in the range of about 0.1:10 to about 0.25:5.

8. The process for polymerizing propylene to solid, high molecular weight polymer having a crystallinity of at least 70% which comprises contacting said propylene, at a temperature of about 160° C. and a pressure of about 400 p.s.i.g., with a catalyst comprising (1) lithium metal, (2) lithium aluminum hydride, (3) titanium trichloride and (4) sodium fluoride, the mole ratio of (1):(2):(3):(4) being about 2:0.5:1:1.

9. The process for polymerizing propylene to solid, high molecular weight polymer having a crystallinity of at least 70% which comprises contacting said propylene, at a temperature of about 165° C. and a pressure of about 1,000 p.s.i.g., with a catalyst comprising (1) lithium metal, (2) lithium aluminum hydride, (3) vanadium trichloride and (4) magnesium oxide, the mole ratio of (1):(2):(3):(4) being about 2:0.5:1:1.

10. The process for polymerizing propylene to solid, high molecular weight polymer having a crystallinity of at least 70% which comprises contacting said propylene, at a temperature of about 168° C. and a pressure of about 1,000 p.s.i.g., with a catalyst comprising (1) lithium metal, (2) lithium aluminum hydride, (3) chromium dichloride and (4) sodium fluoride, the mole ratio of (1):(2):(3):(4) being about 2:0.5:1:0.5.

11. A catalyst for the polymerization of α-monoolefinic hydrocarbons to high molecular weight, highly crystalline polymers comprising (1) lithium metal, (2) lithium aluminum hydride and (3) a halide of a transition metal from Group IV–B—VI–B of the Periodic Table, the valence of the metal in said halide being at least one less than maximum, the mole ratio of (1) and (2), based on lithium content, to (3) being in the range of about 1:2 to about 10:1.

12. A catalyst for the polymerization of α-monoolefinic hydrocarbons to high molecular weight, highly crystalline polymers comprising (1) lithium metal, (2) lithium aluminum hydride, (3) a halide of a transition metal from Group IV–B—VI–B of the Periodic Table, the valence of the metal in said halide being at least one less than maximum and (4) a member selected from the group consisting of a halide of an alkali metal, an oxide of a metal selected from the group consisting of calcium, magnesium and aluminum and a lower alkoxide of a metal selected from the group consisting of calcium, magnesium and aluminum, the mole ratio of (1) and (2), based on lithium content, to (3) being in the range of about 1:2 to about 10:1 and the mole ratio of (4) to (3) being in the range of about 0.1:10 to about 0.25:5.

13. A catalyst for the polymerization of α-monoolefinic hydrocarbons to high molecular weight, highly crystalline polymers comprising (1) lithium metal, (2) lithium aluminum hydride and (3) a halide of a transition metal from Group IV–B—VI–B of the Periodic Table, said metal having an atomic weight of about 47 to about 52, the valence of the metal in said halide being at least one less than maximum, the mole ratio of (1) and (2), based on lithium content, to (3) being in the range of about 1:1 to about 4:1.

14. A catalyst for the polymerization of α-monoolefinic hydrocarbons to high molecular weight, highly crystalline polymers comprising (1) lithium metal, (2) lithium aluminum hydride, (3) a halide of a transition metal, said metal having an atomic weight in the range of about 47 to about 52, the valence of the metal in said halide being at least one less than maximum and (4) a member selected from the group consisting of a halide of an alkali metal, an oxide of a metal selected from the group consisting of calcium, magnesium and aluminum and a lower alkoxide of a metal selected from the group consisting of calcium, magnesium and aluminum, the mole ratio of (1) and (2) based on lithium content, to (3) being in the range of about 1:1 to about 4:1 and the mole ratio of (4) to (3) being in the range of about 0.1:10 to about 0.25:5.

15. A catalyst for the polymerization of α-monoolefinic hydrocarbons to high molecular weight, highly crystalline polymers comprising (1) lithium metal, (2) lithium aluminum hydride and (3) a halide of a transition metal from Group IV–B—VI–B of the Periodic Table, the valence of the metal in said halide being at least one less than maximum, the mole ratio of (1) and (2), based on lithium content, to (3) being in the range of about 1:2 to about 10:1.

16. A catalyst for the polymerization of α-monoolefinic hydrocarbons to high molecular weight, highly crystalline polymers comprising (1) lithium metal, (2) lithium aluminum hydride, (3) a halide of a transition metal from Group IV–B—VI–B of the Periodic Table, the valence of the metal in said halide being at least one less than maximum and (4) a member selected from the group consisting of a halide of an alkali metal, an oxide of a metal selected from the group consisting of calcium, magnesium and aluminum and a lower alkoxide of a metal selected from the group consisting of calcium, magnesium and aluminum, the mole ratio of (1) and (2), based on lithium content, to (3) being in the range of about 1:2 to about 10:1 and the mole ratio of (4) to (3) being in the range of about 0.1:10 to about 0.25:5.

17. A catalyst for the polymerization of α-monoolefinic hydrocarbons to high molecular weight, highly crystalline polymers comprising (1) lithium metal, (2) lithium aluminum hydride, (3) titanium trichloride and (4) sodium fluoride, the mole ratio of (1):(2):(3):(4) being about 2:0.5:1:1.

18. A catalyst for the polymerization of α-monoolefinic hydrocarbons to high molecular weight, highly crystalline polymers comprising (1) lithium metal, (2) lithium aluminum hydride, (3) vanadium trichloride and (4) magnesium oxide, the mole ratio of (1):(2):(3):(4) being about 2:0.5:1:1.

References Cited by the Examiner
UNITED STATES PATENTS

| | | | |
|---|---|---|---|
| 2,879,261 | 3/1959 | Johnson | 260—79.3 |
| 2,886,561 | 5/1959 | Reynolds | 260—94.9 |
| 3,072,628 | 1/1963 | Coover | 260—93.7 |
| 3,125,558 | 3/1964 | Hagemeyer | 260—93.7 |
| 3,149,097 | 9/1964 | Coover | 260—93.7 |

JOSEPH L. SCHOFER, *Primary Examiner.*

M. B. KURTZMAN, *Assistant Examiner.*